United States Patent
Wang et al.

(10) Patent No.: US 10,993,271 B2
(45) Date of Patent: Apr. 27, 2021

(54) UE ACCESS METHOD AND APPARATUS

(71) Applicant: Samsung Electronics Co., Ltd., Suwon-si (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/749,440

(22) PCT Filed: Aug. 18, 2016

(86) PCT No.: PCT/KR2016/009126
§ 371 (c)(1),
(2) Date: Jan. 31, 2018

(87) PCT Pub. No.: WO2017/030399
PCT Pub. Date: Feb. 23, 2017

(65) Prior Publication Data
US 2018/0227964 A1 Aug. 9, 2018

(30) Foreign Application Priority Data

Aug. 18, 2015 (CN) .......................... 201510508367.9

(51) Int. Cl.
*H04W 48/10* (2009.01)
*H04W 76/10* (2018.01)
(Continued)

(52) U.S. Cl.
CPC ........... *H04W 76/10* (2018.02); *H04W 48/20* (2013.01); *H04W 76/20* (2018.02); *H04W 36/0061* (2013.01); *H04W 92/20* (2013.01)

(58) Field of Classification Search
None
See application file for complete search history.

(56) References Cited

U.S. PATENT DOCUMENTS 9,185,613 B2 * 11/2015 Dinan .................... H04W 36/30
9,955,520 B2 * 4/2018 Byun .................... H04W 76/10
(Continued)

FOREIGN PATENT DOCUMENTS

CN 102301793 A 12/2011
EP 2187677 A1 5/2010
(Continued)

OTHER PUBLICATIONS

Supplementary European Search Report dated Jun. 8, 2018 in connection with European Patent Application No. 16 83 7341.
(Continued)

*Primary Examiner* — Ajit Patel

(57) ABSTRACT

Embodiments of the present disclosure provide a UE access method, including: a UE receiving information of supported type(s) of respective cell of a base station broadcasted by the respective cell, wherein the information of the supported type(s) of the respective cell comprises UE type(s) supported by the respective cell; and the UE comparing the type of the UE and the UE type(s) supported by the respective cell, and selecting a cell supporting the type of the UE and transmit an RRC connection setup request message to the selected cell, wherein the RRC connection setup request comprises the type of the UE. The present disclosure further provides several other UE access methods and devices. According to the present disclosure, the method and device which can select different access network of different types for different types of users, the user requirement is met and the network utilization ratio is increased.

20 Claims, 8 Drawing Sheets

(51) Int. Cl.
*H04W 76/20* (2018.01)
*H04W 48/20* (2009.01)
*H04W 36/00* (2009.01)
*H04W 92/20* (2009.01)

(56) References Cited

U.S. PATENT DOCUMENTS

| | | | | |
|---|---|---|---|---|
| 2001/0030953 | A1* | 10/2001 | Chang | H04W 36/0066 370/331 |
| 2005/0130660 | A1* | 6/2005 | Park | H04W 36/26 455/436 |
| 2010/0105401 | A1* | 4/2010 | Chun | H04W 74/0833 455/450 |
| 2010/0197304 | A1 | 8/2010 | Sawhney et al. | |
| 2010/0234029 | A1* | 9/2010 | Ishii | H04W 36/0066 455/437 |
| 2011/0280223 | A1* | 11/2011 | Maeda | H04W 4/08 370/335 |
| 2011/0287759 | A1* | 11/2011 | Jung | H04W 52/0206 455/422.1 |
| 2012/0142387 | A1* | 6/2012 | Kano | H04W 36/0016 455/509 |
| 2012/0177005 | A1* | 7/2012 | Liang | H04W 8/082 370/331 |
| 2012/0302230 | A1 | 11/2012 | Lim et al. | |
| 2012/0314566 | A1 | 12/2012 | Lee et al. | |
| 2013/0021997 | A1 | 1/2013 | Lee | |
| 2013/0039275 | A1* | 2/2013 | Patil | H04W 48/20 370/328 |
| 2013/0089061 | A1* | 4/2013 | Lim | H04W 72/0413 370/329 |
| 2013/0170347 | A1* | 7/2013 | Zhang | H04W 4/70 370/230 |
| 2013/0287012 | A1* | 10/2013 | Pragada | H04W 76/25 370/338 |
| 2013/0343319 | A1 | 12/2013 | Quan et al. | |
| 2014/0056135 | A1 | 2/2014 | Hapsari et al. | |
| 2014/0064156 | A1* | 3/2014 | Paladugu | H04W 36/0022 370/259 |
| 2014/0079022 | A1* | 3/2014 | Wang | H04W 36/22 370/331 |
| 2014/0098756 | A1* | 4/2014 | Tabatabaei Yazdi | H04W 76/10 370/329 |
| 2014/0169500 | A1* | 6/2014 | Dimou | H04L 1/0014 375/316 |
| 2014/0321432 | A1* | 10/2014 | Li | H04W 36/08 370/331 |
| 2014/0378172 | A1 | 12/2014 | Lim | |
| 2015/0110048 | A1* | 4/2015 | Damnjanovic | H04W 76/16 370/329 |
| 2015/0208324 | A1* | 7/2015 | McCann | H04W 48/08 370/338 |
| 2015/0249900 | A1* | 9/2015 | Kim | H04W 24/10 370/252 |
| 2015/0319609 | A1* | 11/2015 | Asterjadhi | H04W 8/22 370/328 |
| 2016/0037386 | A1* | 2/2016 | Pitchaiah | H04W 4/08 709/226 |
| 2016/0100336 | A1* | 4/2016 | Basavarajappa | H04W 48/18 370/331 |
| 2017/0325138 | A1* | 11/2017 | da Silva | H04W 36/0083 |
| 2018/0020431 | A1* | 1/2018 | Cho | H04W 72/12 |

FOREIGN PATENT DOCUMENTS

| | | |
|---|---|---|
| EP | 2685765 A1 | 1/2014 |
| WO | 2013165163 A1 | 11/2013 |
| WO | 2013169822 A1 | 11/2013 |

OTHER PUBLICATIONS

Qualcomm Europe, "UE capability handling in LTE", 3GPP TSG-RAN WG2 meeting #58, May 7-11, 2007, 6 pages, R2-071806.
ISA/KR, International Search Report and Written Opinion of the International Searching Authority, International Application No. PCT/KR2016/009126, dated Nov. 23, 2016, 9 pages.
The First Office Action in connection with Chinese Application No. 201510508367.9 dated Apr. 27, 2020, 25 pages.
Communication pursuant to Article 94(3) EPC in connection with European Application No. 16837341.3 dated Jul. 6, 2020, 10 pages.
Ericsson, "Introduction of category handling for low complexity UEs (option3)," R2-142123, 3GPP TSG-RAN WG2 Meeting #86, Seoul, South Korea, May 19-23, 2014, 4 pages.
Huawei, et al., "RAN2 impacts of Low Cost MTC," R2-140277, 3GPP TSG-RAN WG2 #85, Prague, Czech Republic, Feb. 10-14, 2014, 4 pages.
3GPP TS 25331 V12.6.0 (Jun. 2015), Technical Specification, 3rd Generation Partnership Project; Technical Specification Group Radio Access Network; Radio Resource Control (RRC); Protocol specification (Release 12), Jun. 2015, 2,226 pages.

* cited by examiner

UE ACCESS METHOD AND APPARATUS

CROSS-REFERENCE TO RELATED APPLICATIONS AND CLAIM OF PRIORITY

The present application claims benefit under 35 U.S.C. § 365 and is a 371 National Stage of International Application No. PCT/KR2016/009126, filed Aug. 18, 2016, which claims priority to Chinese Patent Application No. 201510508367.9, filed Aug. 18, 2015, the disclosures of which are fully incorporated herein by reference into the present disclosure as if fully set forth herein.

TECHNICAL FIELD

The present disclosure relates to radio communication techniques, and more particularly, to UE access method and apparatus based on UE requirement.

BACKGROUND

Modern mobile communications tend to provide multimedia services for users with high transmission rates. FIG. 1 shows a system structure of System Architecture Evolution (SAE) according to the prior art, in which:

User Equipment (UE) 101 is a terminal device used for receiving data. Evolved Universal Terrestrial Radio Access Network (E-UTRAN) 102 is a radio access network, including an eNodeB/NodeB which provides an interface for the UE to access the radio network. Mobility Management Entity (MME) 103 is responsible for managing mobility context, session context and security information of the UE. Serving Gateway (SGW) 104 is mainly used for providing a user plane function. The MME 103 and the SGW 104 may be in a same physical entity. Packet data network Gateway (PGW) 105 is responsible for charging, legal listening and other functions. The PGW 105 may also be in the same physical entity with the SGW 104. Policy and Charging Rule Function (PCRF) 106 provides QoS policies and charging rules. Serving GPRS Support Node (SGSN) 108 is a network device for providing route for data transmission in a Universal Mobile Telecommunications System (UMTS). Home Subscriber Server (HSS) 109 is a home sub-system of the UE, and is responsible for protecting user information such as current location, serving node location, user security information and packet data context of the user device.

SUMMARY

Future LTE advanced network may support various user types, e.g., smart home appliance may act as a user type, and smart sensing device on vehicle system may act as another user type. Different types may have different requirements. Some types of users may have high requirement with regard to transmission delay, they may be referred to as Critical Mechanism Type Communication (C-MTC) user. Some types of users may not have high requirement for transmission delay but may require frequent data link establishment to transmit small data with a length of several bits, they are referred to as Massive Mechanism Type Communication (M-MTC) user. For this kind of users, signaling procedure required for establishing data link needs to be simplified to reduce the load of the control plane.

In view of the above, for different types of users, there may be different requirements for the network. The current LTE network architecture uses a universal access network for providing services for all users, which cannot meet the requirements of different users flexibly, and the network utilization ratio is not optimized.

In view of the above, the present disclosure provides methods and apparatuses for selecting different access networks for different types of users, so as to meet the requirements of the users and increase the network utilization ratio.

The present disclosure further provides a UE access method, including:

transmitting, by a UE, an RRC connection setup request message to a base station, wherein the RRC connection setup request message comprises type information; the type information comprises a type of the UE; and receiving, by the UE from the base station, an RRC connection setup response message or a redirect message, wherein the redirect message comprises an identifier of a destination base station and/or a cell unique identifier or a physical layer identifier of a target cell, the destination base station or the target cell supports the type corresponding to the type information.

In some embodiments, if the UE receives the RRC connection setup response message from the base station, the method further includes:

after an RRC connection setup procedure completes, the UE receiving the redirect message from the base station, or the base station handing over the UE to the destination base station, wherein the destination base station supports the type corresponding to the type information.

The present disclosure further provides a UE, including: a third transmitting module and a third receiving module; wherein the third transmitting module is adapted to transmit an RRC connection setup request message to a base station, wherein the RRC connection setup request message comprises type information, the type information comprises a type of the UE; and the third receiving module is adapted to receive an RRC connection setup response message or a redirect message from the base station, wherein the redirect message comprises an identifier of the destination base station and/or a cell unique identifier or a physical layer identifier of a target cell, the destination base station or the target cell supports the type corresponding to the type information.

The present disclosure further provides a UE access method, including:

a base station receiving an RRC connection setup request message from a UE, wherein the RRC connection setup request message comprises type information, the type information comprises a type of the UE;

if the base station does not support the type corresponding to the type information, the base station redirecting the UE to a destination base station which supports the type, or the base station handing over the UE to a destination base station supporting the type.

In some embodiments, the redirecting the UE to the destination base station supporting the type by the base station includes:

after the base station receives the RRC connection setup request message from the UE or after the RRC connection setup procedure completes, the base station finding the destination base station supporting the type from surrounding base stations, and transmitting the redirect message to the UE, wherein the redirect message comprises an identifier of the destination base station and/or a cell unique identifier or a physical layer identifier of a target cell, the destination base station or the target cell supports the type corresponding to the type information.

In some embodiments, the base station handing over the UE to the destination base station supporting the type includes:

after the RRC connection setup procedure completes, the base station handing over the UE to the destination base station supporting the type.

In some embodiments, the method further includes:

during an X2 setup procedure, the base station obtaining and saving the information of the supported types of cells of surrounding base stations.

The present disclosure further provides a base station, including: a fourth receiving module and a fourth processing module; wherein the fourth receiving module is adapted to receive an RRC connection setup request message from the UE, wherein the RRC connection setup request message comprises type information, the type information comprises a type of the UE; and the fourth processing module is adapted to redirect the UE to a destination base station supporting the type or hand over the UE to a destination base station supporting the type if the base station does not support the type corresponding to the type information.

The present disclosure further provides a UE access method, including:

a base station receiving type information of a UE from a core network device, wherein the type information comprises a type of the UE; and if the base station does not support the type corresponding to the type information, the base station handing over the UE to a destination base station supporting the type.

In some embodiments, the method further includes:

the base station obtaining and saving the information of supported types of cells of surrounding base stations during an X2 setup procedure.

The present disclosure further provides a base station, including: a fifth receiving module and a fifth handover module, wherein the fifth receiving module is adapted to receive type information of a UE from a core network device, wherein the type information comprises: a type of the UE; and the fifth handover module, adapted to hand over the UE to a destination base station supporting the type corresponding to the type information if the base station does not support the type corresponding to the type information.

The present disclosure further provides a UE access method, including:

a core network device receiving an initial UE message from a base station; and the core network device transmitting type information of the UE to the base station, wherein the type information comprises: a type of the UE.

The present disclosure further provides a core network device, including: a sixth receiving module and a sixth transmitting module, wherein the sixth receiving module is adapted to receive an initial UE message from a base station; and the sixth transmitting module is adapted to transmit type information of the UE to the base station, wherein the type information comprise a type of the UE.

The present disclosure further provides a UE access method, including:

a core network device receiving an initial UE message from a base station, wherein the message comprises an identifier of the UE; and if the core network device does not support the type of the UE, the core network device finding a destination core network device supporting the type of the UE, and transmitting an identifier of the destination core network device and/or the type information of the UE to the base station via a redirect message.

The present disclosure further provides a core network device, comprising: a seventh receiving module and an eighth redirection module, including:

a seventh receiving module, adapted to receive an initial UE message from a base station, wherein the message comprises an identifier of the UE; and the eighth redirection module, adapted to find, if the core network device does not support the type of the UE, a destination core network device supporting the type of the UE, and transmit an identifier of the destination core network device and/or type information of the UE to the base station via a redirect message.

The present disclosure further provides a UE access method, including:

a base station transmitting an initial UE message to a core network device, wherein the message comprises an identifier of the UE; and the base station receiving a redirect message from the core network device, wherein the redirect message comprises an identifier of a destination core network device and/or type information of the UE, wherein the destination core network device supports the type of the UE.

In some embodiments, if the redirect message comprises only the identifier of the destination core network device, the method further comprises: according to the identifier of the destination core network device and preconfigured information, determining type information of the UE, wherein the type information of the UE comprises a type of the UE.

In some embodiments, the method further includes:

according to the type information of the UE, if the base station does not support the type corresponding to the type information, or there is a dedicated base station corresponding to the type among surrounding base stations, handing over the UE to a base station supporting the type corresponding to the type information or to the dedicated base station.

The present disclosure further provides a base station, including: an eighth transmitting module and an eighth receiving module; wherein the eighth transmitting module is adapted to transmit an initial UE message to the core network device, wherein the message comprises an identifier of the UE; and the eighth receiving module, adapted to receive a redirect message from the core network device, wherein the redirect message comprises an identifier of a destination core network device and/or type information of the UE; wherein the destination core network device supports the type of the UE.

The present disclosure further provides a method of a UE, including:

transmitting a radio resource control (RRC) connection setup request message including first information on a type of the UE, to a base station;

receiving an RRC connection setup message from the base station if the type of the UE is supported by the base station; and transmitting data to the base station.

In some embodiments, the method further includes:

receiving a redirect message, including second information on a destination base station corresponding to the type of the UE, from the base station if the type of the UE is not supported by the base station; and transmitting the RRC connection setup request message to the destination base station.

In some embodiments, the method further includes:
receiving third information on a type supported by a plurality of cells of the base station.
In some embodiments, the method further includes:
comparing the type of the UE with the type supported by a plurality of cells of the base station;
selecting a cell supporting the type of the UE; and
transmitting the RRC connection setup request message on the selected cell.

The present disclosure further provides a method of a base station, including:
receiving a radio resource control (RRC) connection setup request message including first information on a type of a user equipment (UE), from the UE;
identifying whether to support the type of the UE; and
transmitting an RRC connection setup message to the UE if the base station supports the type of the UE.

In some embodiments, the method further includes:
transmitting a redirect message, including second information on a destination base station corresponding to the type of the UE, to the UE if the base station does not support the type of the UE.

In some embodiments, the method further includes:
transmitting third information on a type supported by a plurality of cells of the base station.

The present disclosure further provides a UE, including:
a transceiver configured to transmit and receive a signal; and
a controller configured to transmit a radio resource control (RRC) connection setup request message including first information on a type of the UE to a base station, to receive an RRC connection setup message from the base station if the type of the UE is supported by the base station, and to transmit data to the base station.

In some embodiments, wherein the controller is configured to receive a redirect message, including second information on a destination base station corresponding to the type of the UE, from the base station if the type of the UE is not supported by the base station, and to transmit the RRC connection setup request message to the destination base station.

In some embodiments, wherein the controller is configured to receive third information on a type supported by a plurality of cells of the base station.

In some embodiments, wherein the controller is configured to compare the type of the UE with the type supported by a plurality of cells of the base station, to select a cell supporting the type of the UE, and to transmit the RRC connection setup request message on the selected cell.

The present disclosure further provides a base station, including:
a transceiver configured to transmit and receive a signal; and
a controller configured to receive a radio resource control (RRC) connection setup request message including first information on a type of a user equipment (UE) from the UE, to identify whether to support the type of the UE, and to transmit an RRC connection setup message to the UE if the base station supports the type of the UE.

In some embodiments, wherein the controller is configured to transmit a redirect message, including second information on a destination base station corresponding to the type of the UE, to the UE if the base station does not support the type of the UE.

In some embodiments, wherein the controller is configured to transmit third information on a type supported by a plurality of cells of the base station.

The present disclosure provides new network architecture. The present disclosure also provides a method for selecting an appropriate access network for the UE in the new network architecture. Through the method provided by the present disclosure, it is possible to select an appropriate access network for the user and increase the flexibility and utilization ratio of the network.

DETAILED DESCRIPTION

The present disclosure will be described in further detail hereinafter with reference to accompanying drawings and embodiments to make the objective, technical solution and merits therein clearer.

Figure 1:
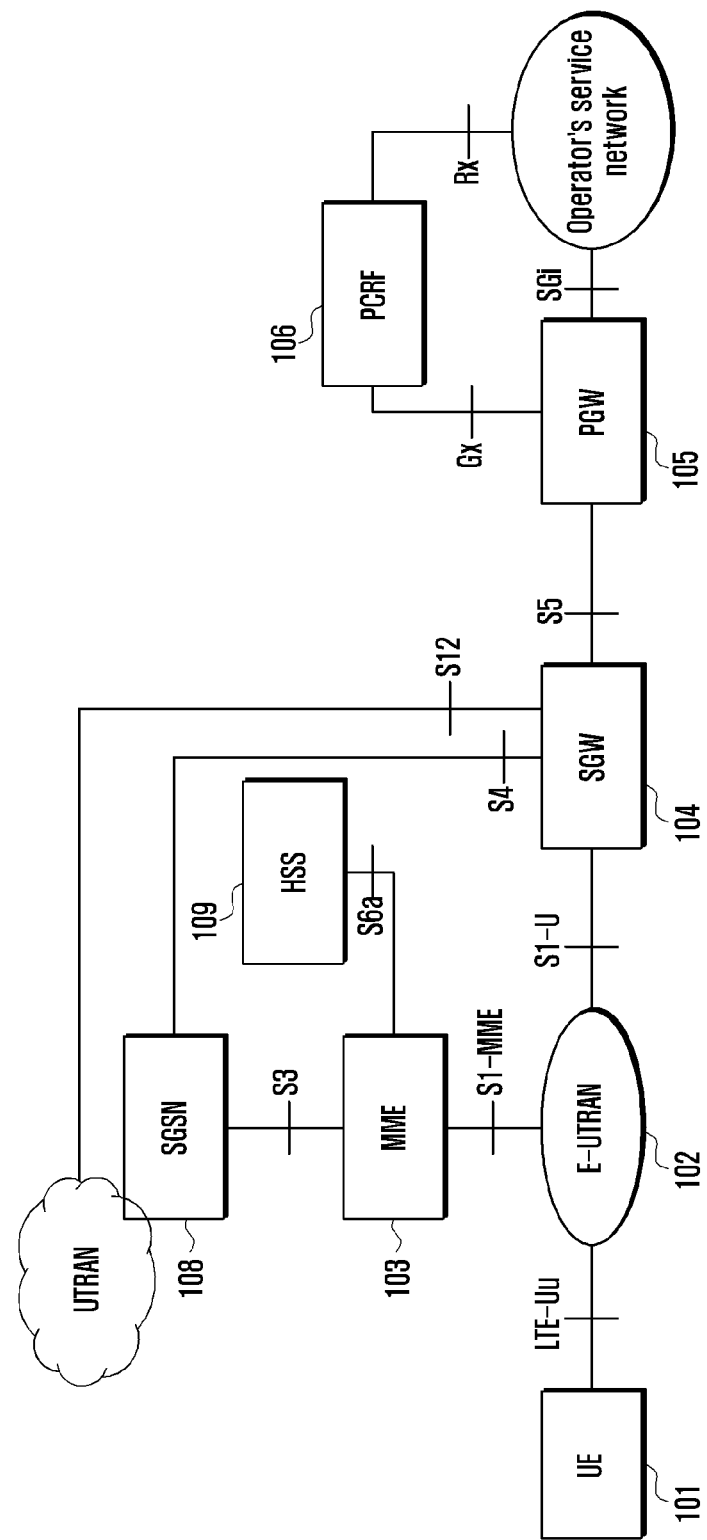
FIG. 1 is a schematic diagram illustrating a system architecture of SAE according to the prior art.
Figure 2:
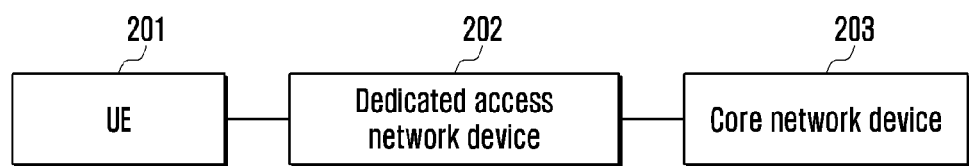
FIG. 2 is a schematic diagram illustrating a structure of a dedicated access system according to embodiments of the present disclosure.

FIG. 2 is a schematic diagram illustrating a structure of a dedicated access system provided by the present disclosure. The structure includes: a user equipment (201), a dedicated access network device (202) and a core network device (203); in which:

User equipment (UE): UEs may be divided into different types according to their characteristics or different requirements of service types requested by the UEs, e.g., M-MTC, C-MTC.

Dedicated access network device: the dedicated access network device includes an eNB supporting a particular UE type. A cell of a universal eNB may support all UE types. Thus, the cell supporting all UE types is referred to as a universal cell. However, a dedicated eNB is designed for a particular UE type. The cell of such eNB supports merely a particular UE type, e.g., the particular UE type of M-MTC user. The access network optimizes the configuration of the wireless channel according to the particular type of the UE. The optimization is able to improve the performance of the particular type of UE, but is not applicable for all UE types. The cell which supports merely the particular UE type is referred to as a dedicated cell. The eNB may include multiple cells. The dedicated access network may be implemented via the following manners based on different combinations of the cells:

1) the base station includes both universal cell and dedicated cell;

2) the base station includes merely dedicated cell.

Core network device: the core network device may be a universal core network device, i.e., a core network supporting all UE types, or may be a dedicated core network device, i.e., a core network supporting a particular UE type.

Figure 3:
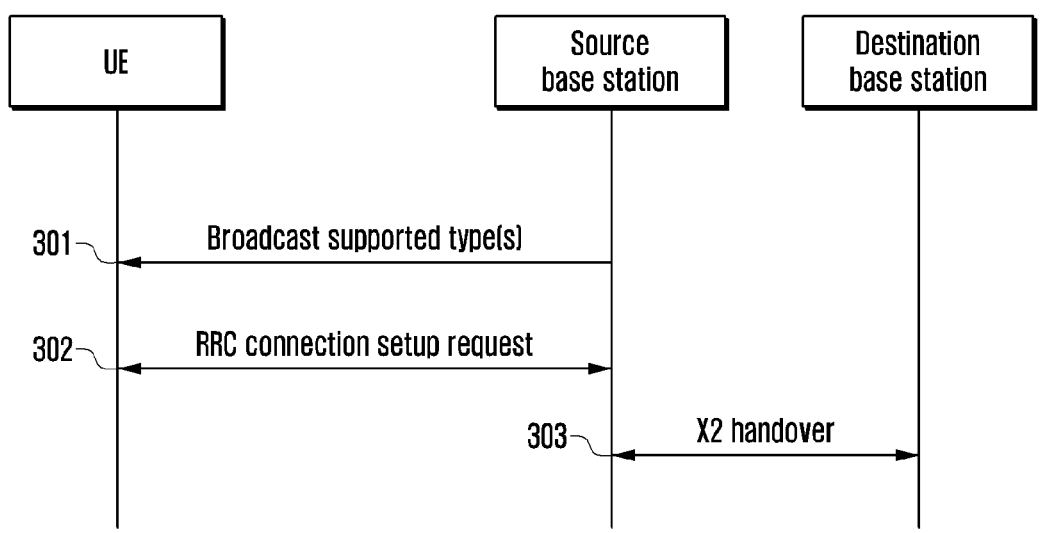
FIG. 3 is a schematic diagram illustrating a method for selecting an appropriate access network apparatus for the UE according to some embodiments of the present disclosure.

FIG. 3 shows a method for selecting an appropriate access network device for the UE according to the present disclosure. The method of FIG. 3 is performed in the structure as shown in FIG. 2 to select an appropriate access network for the UE based on the type of the UE. The method includes the following.

In step 301, a cell of the base station broadcasts UE type(s) supported by the cell.

If the cell of the base station supports one or several UE types, the cell broadcasts the UE type(s) supported by the cell in a broadcast message. For example, if the cell supports merely M-MTC user, the broadcast message includes the supported UE type: M-MTC.

In step 302, the UE selects an access network and initiates an RRC connection setup procedure. The RRC connection setup procedure includes: the UE transmits an RRC connection setup request message to the base station, the base station allocates necessary resources and transmits an RRC connection setup message to the UE, the UE saves information and configures the resources, and then transmits an RRC connection setup complete message to the base station.

If the UE is able to recognize the cell supported type(s) broadcasted in step 301, when selecting a cell to camp on, the UE in an idle state compares the type of itself and the cell supported type(s) broadcasted in step 301, selects a cell supporting the type of present UE as the cell to camp on and initiates the RRC connection setup procedure. The RRC connection setup request message may further includes the type of the UE.

If the UE cannot recognize the cell supported type(s) broadcasted in step 301, when the UE initiates the RRC connection setup, the RRC connection setup request or the RRC connection setup complete message does not include the type of the UE. The base station may initiate the message in step 303. The base station finds a surrounding base station which is able to serve the UE and initiates an X2 handover procedure to hand over the UE to a universal base station. In the handover request message, a source base station may notify a destination base station of the type of the UE. In order to determine whether the destination base station is able to serve the UE, the base stations need to exchange UE types supported by cells of the base stations. For example, the UE types supported by the cell of the base station are carried during the X2 setup procedure. Through this procedure, the base station can save the UE types supported by cells of surrounding base stations. If the source base station and the destination base station have no X2 connection, an S1 handover procedure may be implemented. The handover procedure is similar to the existing S1 handover procedure. The difference relies in that, the source base station may carry the type of the UE in the S1 handover procure to notify the destination base station.

In accordance with the method as shown in FIG. 3, the present disclosure provides a UE, including: a first receiving module and a first transmitting module; wherein the first receiving module is adapted to receive information of type(s) supported by a cell broadcasted by the cell of the base station, wherein the information of the type(s) supported by the cell includes: UE type(s) supported by the cell; and the first transmitting module, adapted to select a cell supporting the type of the UE based on a comparison of the type of the UE and the UE type(s) supported by the cell, and transmit an RRC connection setup request message to the cell.

In accordance with the method as shown in FIG. 3, the present disclosure further provides a base station, including: a second transmitting device and a second receiving device; wherein the second transmitting device is adapted to broadcast the information of the type(s) supported by the cell of the base station, wherein the information of the type(s) supported by the cell includes: the UE type(s) supported by the cell; and the second receiving device is adapted to receive the RRC connection setup request message transmitted by the UE.

It should be noted that, in the above description, the method provided by the present disclosure selects the access network supporting the UE type according to the type of the UE. In practical, the method of the present disclosure is also applicable for the determination performed by the cell according to the service type requested by the UE, wherein the dedicated cell supports a particular service type. Accordingly, through replacing the UE type in the method of the present disclosure by the service type, it is possible to select an appropriate access network according to the service type requested by the UE, which is not repeated hereinafter.

Figure 4:
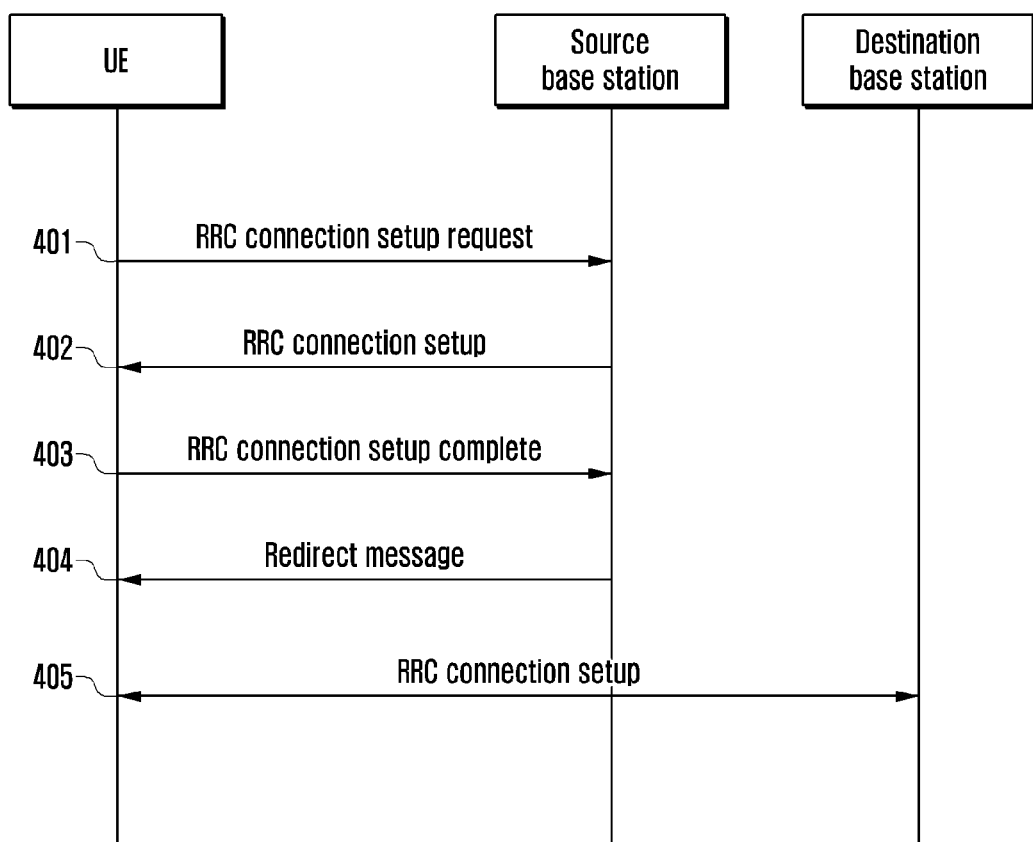
FIG. 4 shows a signaling flow of a method in which the UE notifies the base station of the type of the UE and the base station determines whether to allow access of the UE according to the present disclosure.

FIG. 4 shows a signaling flow of a method that the UE notifies the base station of the type of the UE and the base station determines whether allows access of the UE according to the present disclosure. The flow includes the following.

In step 401, the UE transmits an RRC connection setup request message, carrying an identifier of the UE and RRC establishment cause, etc.

The message may further include the type of the UE, e.g., M-MTC type. Or, it is possible to indicate the type of the UE or the type of the service to be provided in the RRC establishment cause. For example, the RRC establishment cause may indicate that the type of the UE is the M-MTC, or the RRC establishment cause may indicate that the type of the service to be established is of the M-MTC type.

It is also possible to utilize an existing RRC connection setup request in step 401. After the base station transmits an RRC connection setup response to the UE, the UE transmits an RRC connection setup complete message carrying the type of the UE to the base station.

In step 402, the eNB transmits a redirect message to the UE.

The eNB determines whether it can provide the required service to the UE. If yes, the method proceeds with normal signaling procedure to transmit normal message to the UE, without executing step 402. Otherwise, the eNB transmits a redirect message to the UE, carrying the identifier of a destination eNB, and/or a cell unique identifier or a physical layer identifier of a target cell. In order to determine whether a surrounding eNB supports a particular UE type, the base stations need to exchange the supported UE types of the cells of the base stations. For example, the UE types supported by the cell of the base station may be carried in the X2 setup procedure. Through this procedure, the base station can save the UE types supported by the cells of the surrounding base stations.

Step 402 may also be performed after the normal RRC connection setup is completed. In the RRC connection setup complete message, the measurement result of the surrounding cells obtained by the UE is included. According to the measurement result of the UE and the information of cells of the surrounding base stations saved by the base station, the base station may make the determination.

Figure 5:
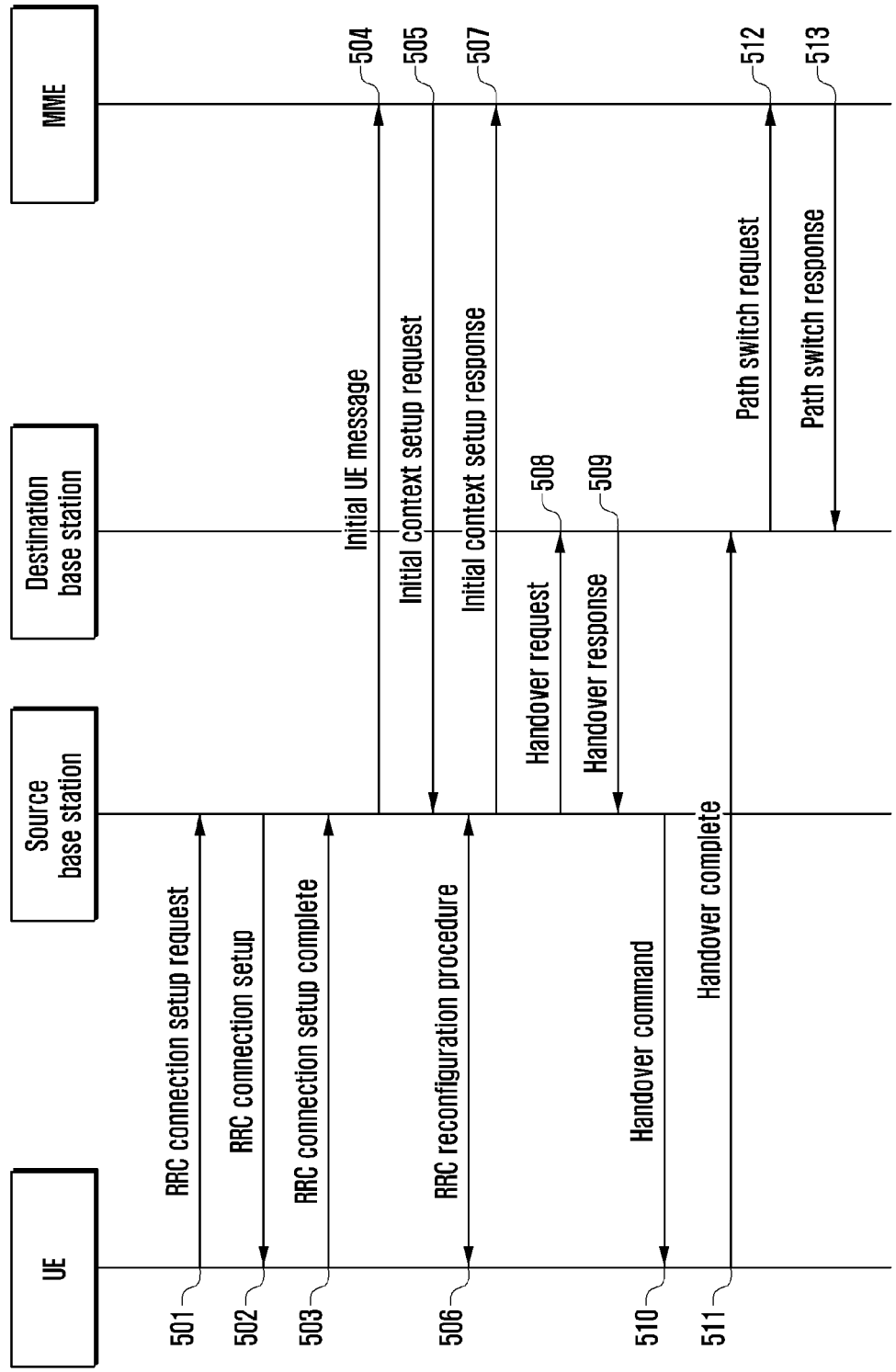
FIG. 5 shows a signaling flow of another method in which the UE notifies the base station of the type of the UE and the base station determines whether to allow access of the UE according to the present disclosure.

FIG. 5 shows a signaling flow of another method in which the UE notifies the base station of the UE type and the base station determines whether to allow access of the UE according to the present disclosure. The flow includes the following.

In step 501, the UE transmits an RRC connection setup request, carrying the identifier of the UE and RRC establishment cause, etc.

The message may further include the type of the UE, e.g. M-MTC type. Or, it is possible to indicate the type of the UE in the RRC establishment cause. For example, the RRC establishment cause may indicate that the type of the UE is the M-MTC, or the RRC establishment cause may indicate that the type of the service to be established is of the M-MTC type.

It is also possible to utilize an existing RRC connection setup request in step 501. After the base station transmits an RRC connection setup response to the UE, the UE transmits an RRC connection setup complete message carrying the type of the UE or the type of the service to be established to the base station.

In step 502, the base station transmits an RRC connection setup message to the UE.

In step 503, the UE transmits an RRC connection setup complete message to the base station.

In step 504, the base station transmits an initial UE message to the MME.

In step 505, the MME transmits an initial context setup request message to the base station.

In step 506, the base station transmits a corresponding RRC message to the UE and performs the RRC reconfiguration procedure.

In step 507, the base station transmits an initial context setup response message to the MME.

The above steps are similar to the existing RRC connection setup procedure and the S1 signaling setup procedure.

In step 508, the source base station transmits a handover request message to a destination base station.

Figure 8:
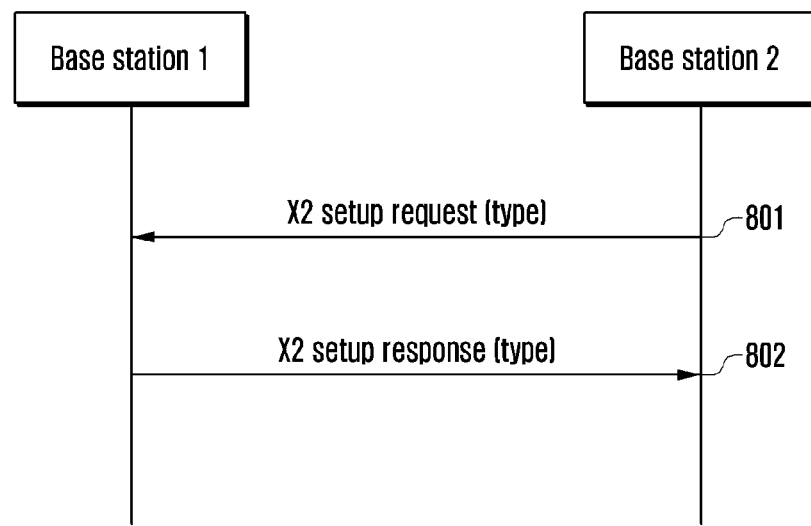
FIG. 8 is a schematic diagram illustrating exchanging of UE types during an X2 handover procedure between base stations according to the present disclosure.

The base station determines whether it can provide service to the UE according to the UE type and the type(s) supported by the base station. If the base station supports the UE type and can provide service for the UE most effectively, the method proceeds with normal procedure, without executing step 508. If the base station does not support the UE type, the base station determines whether there is a more appropriate base station in the surroundings which can provide service for the UE. In order to make the determination, the base stations have to exchange the UE types supported by their cells. For example, the UE type(s) supported by the cell of the base station may be carried during the procedure of X2 establishment, as shown in FIG. 8. Through this procedure, the base station is able to obtain and save the UE types supported by the cells of surrounding base stations. If there is a more appropriate base station in the surroundings, the source base station transmits a handover request to the destination base station, wherein the handover request includes information of the destination base station and a target cell. The message may further include the type of the UE.

In step 509, the destination base station transmits a handover response message to the source base station.

In step 510, the source base station transmits a handover command to the UE.

In step 511, the UE synchronizes with the target cell, and transmits a handover complete message to the destination base station.

In step 512, the destination base station transmits a path switch request message to the core network.

In step 513, the core network transmits a path switch response message to the destination base station, and the handover procedure completes.

Steps 508 to 513 correspond to the X2 handover procedure. If the source base station and the destination base station have no X2 connection, an S1 handover procedure may be performed. The handover procedure is similar as the existing S1 handover procedure. The difference relies in that the source base station may carry the type of the UE during the S1 handover procedure and inform the destination base station of the type of the UE.

In accordance with the methods as shown in FIGS. 4 and 5, the present disclosure provides a UE, including: a third transmitting module and a third receiving module; wherein the third transmitting module is adapted to transmit an RRC connection setup request message to the base station, wherein the RRC connection setup request message includes type information, the type information includes: the type of the UE; and the third receiving module is adapted to receive an RRC connection setup response message or a redirect message from the base station, wherein the redirect message includes an identifier of the destination base station and/or a cell unique identifier or a physical layer identifier of a target cell, the destination base station or the target cell supports the type corresponding to the type information.

In accordance with the methods as shown in FIGS. 4 and 5, the present disclosure provides a base station, including: a fourth receiving module and a fourth processing module; wherein the fourth receiving module is adapted to receive an RRC connection setup request message from the UE, wherein the RRC connection setup request message includes type information, the type information includes: the type of the UE; and the fourth processing module, adapted to redirect the UE to a destination base station supporting the type or hand over the UE to a destination base station supporting the type if the base station does not support the type corresponding to the type information.

Figure 6:
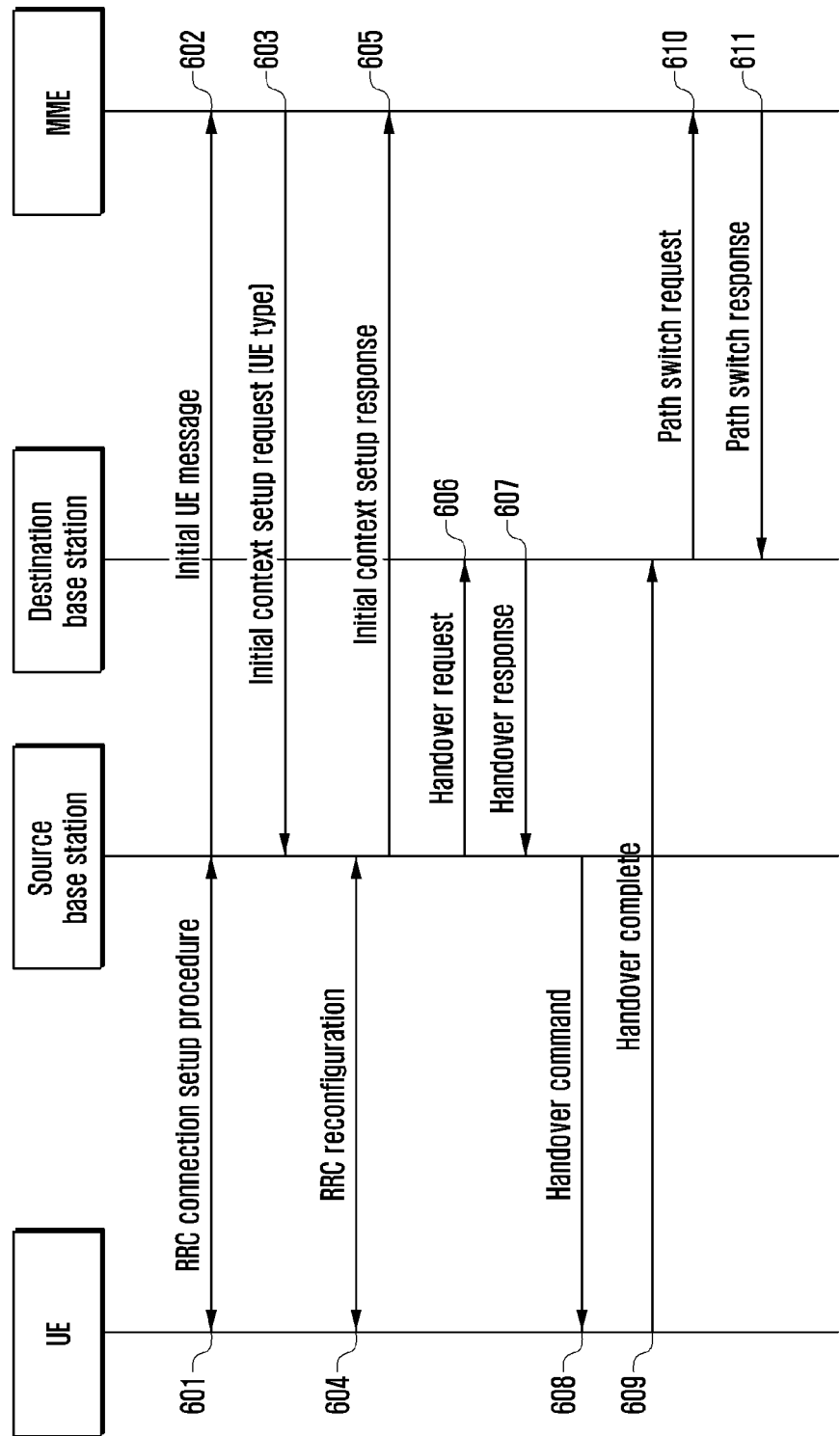
FIG. 6 shows a signaling flow of a method in which the core network indicates to the base station the type of the UE and the base station determines whether to allow access of the UE according to the present disclosure.

FIG. 6 shows a signaling flow of a method in which the core network indicates the type of the UE to the base station and the base station determines whether to allow access of the UE according to the present disclosure. The flow includes the following.

In step 601, the UE sets up an RRC connection. The RRC connection setup procedure includes: the UE transmitting an RRC connection setup request to the base station, the base station allocating necessary resources and transmitting an RRC connection setup message to the UE, the UE saving the information, configuring the resources and transmitting an RRC connection setup complete message to the base station.

In step 602, the base station transmits an initial UE message to the core network.

In step 603, the core network acquires that the UE is of a special type or the service of the UE is of a special type based on subscription information of the UE. The MME may obtain the subscription information of the UE from an HSS, which is an existing procedure. The subscription information indicates whether the UE is of the special type, e.g., M-MTC, C-MTC, or other types. The MME may be a universal MME which supports all UE types, or a dedicated MME which supports merely a particular UE type or a particular service type. Suppose that the core network herein is a universal core network, or the core network herein is a dedicated core network but supports the type of the UE or the service type of the UE. The core network transmits an initial context setup request message, wherein the message contains the type of the UE (or an indication of the service type), e.g., the message may indicate that the UE type is M-MTC.

In step 604, the base station configures the UE. The base station transmits an RRC reconfiguration request message to the UE. The UE configures the resources of the UE according to information in the RRC reconfiguration request message and transmits an RRC reconfiguration response message to the base station.

In step 605, the base station transmits an initial context setup response message to the MME.

In step 606, the source base station transmits a handover request message to the destination base station, wherein the handover request message contains information of a target cell.

Based on step 604, the base station obtains the type of the UE. The base station is able to determine whether it can provide service to the UE according to the type of the UE and the type(s) supported by the base station. If the base station is able to establish a bearer for the type and provide service, or if the base station is a universal base station which does not differentiate different types and is able to provide service to the UE most effectively, the method proceeds with normal procedure. If the base station does not support the UE type, the base station determines whether there is a more appropriate base station in the surroundings which is able to provide service to the UE. If finding the more appropriate base station (i.e., destination base station), the base station transmits the message in step 606. In order to make the determination, base stations need to exchange UE types supported by cells of the base stations. For example, as shown in FIG. 8, the UE type(s) supported by the cell of the base station may be carried during the X2 setup procedure. Through this procedure, the base station is able to obtain and save the UE types supported by the cells of the surrounding base stations. According to a UE measurement result and information of the surrounding cells saved by the base station, the base station can make the determination. If there is a more appropriate base station in the surroundings, the source base station transmits a handover request message to the destination base station. The handover request message includes the information of a target cell, and may further include the type of the UE.

In step 607, the destination base station transmits a handover response message to the source base station.

In step 608, the source base station transmits a handover command to the UE.

In step 609, the UE is synchronized with the target cell, and transmits a handover complete message to the destination base station.

In step 610, the destination base station transmits a path switch request message to the core network.

In step 611, the core network transmits a path switch response message to the destination base station, and the handover procedure completes.

Steps 606 to 611 correspond to the X2 handover procedure. If the source base station and the destination base station have no X2 connection, an S1 handover procedure may be performed. The handover procedure is similar as the existing S1 handover procedure. The difference relies in that the source base station may carry the type of the UE in a message during the S1 handover procedure and inform the destination base station of the type of the UE.

In accordance with the method as shown in FIG. 6, the present disclosure provides a base station, including: a fifth receiving module and a fifth handover module; wherein the fifth receiving module is adapted to receive type information of the UE from a core network device, wherein the type information includes the type of the UE; and the fifth handover module is adapted to hand over the UE to a destination base station supporting the type if the base station does not support the type corresponding to the type information.

In accordance with the method as shown in FIG. 6, the present disclosure provides a core network device, including: a sixth receiving module and a sixth transmitting module; wherein the sixth receiving module is adapted to receive an initial UE message from the base station; and the sixth transmitting module is adapted to transmit type information of the UE to the base station, the type information includes: the type of the UE.

Figure 7:
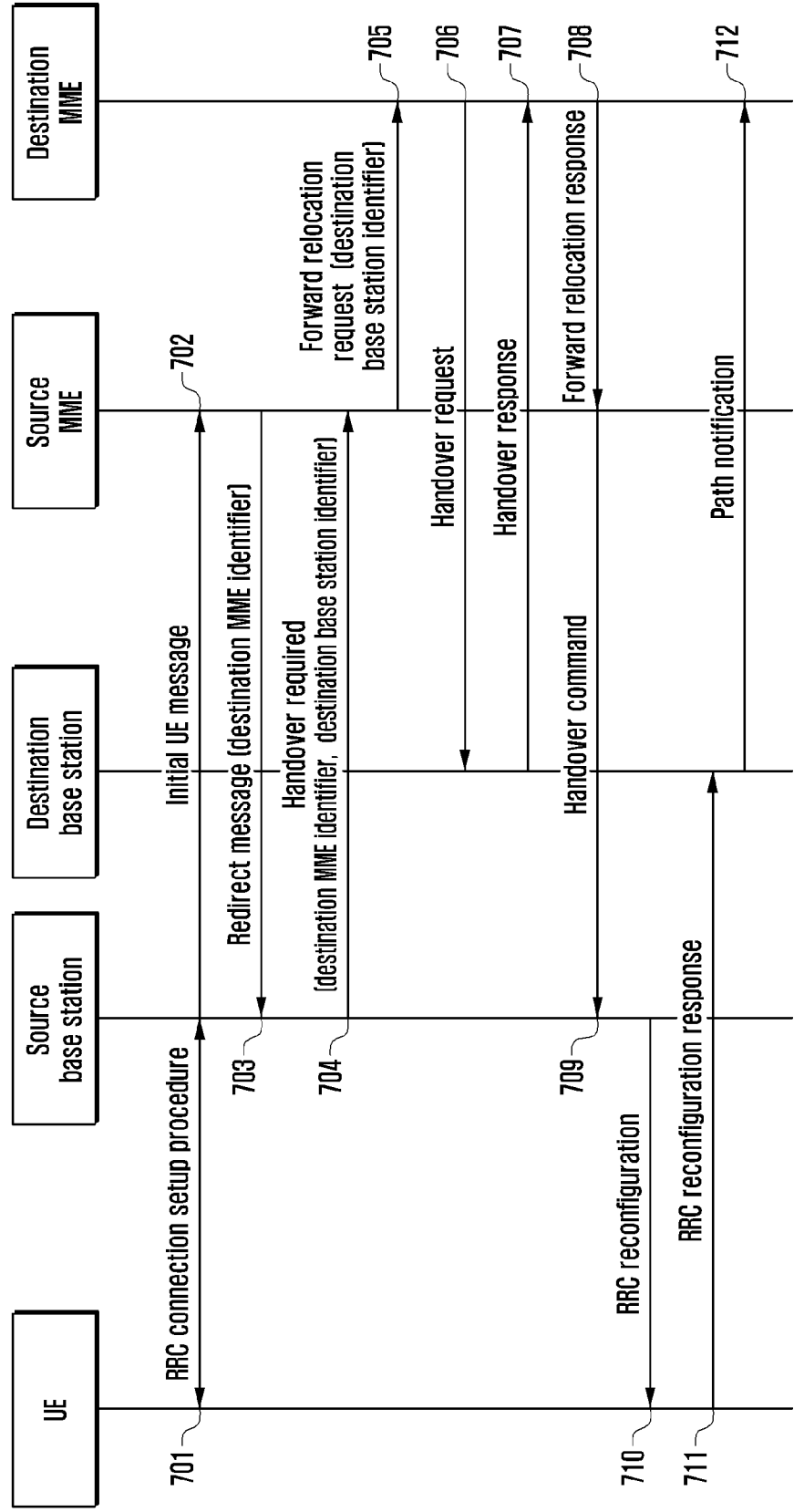
FIG. 7 shows a signaling flow of another method in which the core network indicates to the base station the type of the UE and the base station determines whether to allow access of the UE according to the present disclosure.

FIG. 7 is a signaling flowchart illustrating a method in which the core network indicates the type of the UE to the base station and the base station determines whether to allow access of the UE according to the present disclosure.

In step 701, the UE sets up an RRC connection.

In step 702, the base station transmits an initial UE message to the core network.

In step 703, the MME acquires that the UE is of a special type or the service of the UE is of a special type based on subscription information of the UE. The MME may obtain the subscription information of the UE from an HSS, which is an existing procedure. The subscription information indicates whether the UE is of the special type, e.g., M-MTC, C-MTC, or other types. The MME may be a universal MME which supports all UE types, or a dedicated MME which supports merely a particular UE type or a particular service type. If the MME is a dedicated MME and the dedicated MME does not support the type of the UE or does not support the service type of the UE, the MME (i.e. source MME) finds another MME (i.e., destination MME) supporting the type of the UE, and transmits a redirect message to the base station, wherein the message includes the type of the UE, e.g., the message indicates that the UE of the type M-MTC, the message may further include an MME Code (MMEC) of the destination MME.

Or, the message in step 703 includes merely the MMEC of the destination MME and does not include the type of the UE. Since the type of the UE is subscription information, the MME does not directly transmit the subscription information to the base station. Thus, the base station is able to know the type of the UE or the service type of the UE through preconfigured information, or through a correspondence relationship between MMEC and the supported UE type or service type and the MMEC.

In step 704, through step 703, the base station obtains the type of the UE. If the base station is able establish a bearer for the type and provide service, or the base station is a universal base station and does not differentiate different types, the base station finds the destination MME according to the MMEC contained in step 703, and transmits an initial UE message to the destination MME. Then, the destination MME becomes a serving MME of the UE, assigns an identifier for the UE and configures a base station to provide service for the UE, which is similar to the existing signaling procedure and is not repeated herein.

Based on step 703, the base station obtains the type of the UE. If the base station cannot establish a bearer and provide service for the type, or although the base station can provide service but is not the most appropriate base station, the base station determines whether there is a more appropriate base station in the surroundings which is able to provide service to the UE. The so-called more appropriate means there is a dedicated base station in the surroundings which is designed for the type. In order to make the determination, base stations need to exchange UE types or service types supported by cells of the base stations. For example, as shown in FIG. 8, the UE types supported by the cell of the base station may be carried during the X2 setup procedure. Through this procedure, the base station is able to obtain and save the UE types supported by the cells of the surrounding base stations. The base station is able to obtain a UE measurement result of a surrounding cell through an RRC connection setup procedure, or through a measurement report procedure of the UE. According to the UE measurement result and information of the surrounding cells saved by the base station, the base station (i.e., source base station) can make the determination. If there is a more appropriate base station (i.e., destination base station) in the surroundings, the source base station initiates an S1 handover, hands over the serving base station to the destination MME, and hands over the UE to the destination base station. The source base station transmits a handover required message to the source MME, containing the identifier MMEC of the destination MME and an identifier of the destination base station.

If the message in step 703 includes merely the MMEC of the destination MME and does not include the type of the UE, the base station obtains a correspondence relationship between the MMEC and the supported UE types according to preconfigured information. Based on the correspondence relationship, together with the UE measurement result and the information of surrounding cells saved by the base station, the base station (i.e., source base station) can make the determination. If there is a more appropriate base station (i.e., destination base station) in the surroundings, the source base station initiates an S1 handover, hands over the serving base station to the destination MME, and hands over the UE to the destination base station. The source base station transmits a handover required message to the source MME, containing the identifier MMEC of the destination MME and an identifier of the destination base station.

In step 705, the source MME transmits a forward relocation request to the destination MME, carrying the identifier of the destination base station. According to the destination MME identifier MMEC contained in step 704, the source MME forwards the message to the destination MME, wherein the message includes the identifier of the destination base station.

In step 706, the destination MME transmits a handover request to the destination base station. According to the identifier of the destination base station contained in step 705, the destination MME finds the destination base station and transmits the message to the destination base station.

In step 707, the destination base station transmits a handover response to the destination MME. The destination base station saves UE context information, allocates or reserves required resources for the UE, the destination base station transmits a response message to the destination MME.

In step 708, the destination MME transmits a forward relocation response message to the source MME.

In step 709, the source MME transmits a handover command to the source base station.

In step 710, the source base station transmits an RRC reconfiguration message to the UE.

In step 711, the UE is synchronized with the target cell, and transmits a handover complete message to the destination base station.

In step 712, the destination base station transmits a path switch notification message to the core network, and the handover procedure completes.

In accordance with the method as shown in FIG. 7, the present disclosure provides a core network device, including: a seventh receiving module and an eighth redirection module, wherein the seventh receiving module, adapted to receive an initial UE message from the base station, wherein the message includes an identifier of the UE; and the eighth redirection module is adapted to find, if the core network device does not support the type of the UE, a destination core network device supporting the type of the UE, and transmit the identifier of the destination core network device and/or type information of the UE to the base station via a redirect message.

In accordance with the method as shown in FIG. 7, the present disclosure provides a base station, including: an eight transmitting module and an eight receiving module; wherein the eighth transmitting module is adapted to transmit an initial UE message to the core network device, wherein the message includes an identifier of the UE; and the eighth receiving module is adapted to receive a redirect message from the core network device, wherein the redirect message includes an identifier of the destination core network device and/or type information of the UE; the destination core network device supports the type of the UE.

FIG. 8 is a flowchart illustrating a process of determining whether surrounding base station supports the particular UE type by the base station according to the present disclosure. The process includes the following.

In step 801, base station 2 transmits an X2 setup request message to base station 1, wherein the message carries UE type(s) or service type(s) supported by a cell of base station 2. After receiving the message, base station 1 saves the UE type(s) or service type(s) supported by the cell of base station 2.

In step 802, base station 1 transmits an X2 setup response message, carrying the UE type(s) or service type(s) supported by a cell of base station 1. After receiving the message, the base station 2 saves the UE type(s) or service type(s) supported by the cell of base station 1.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method performed by a user equipment (UE) in a wireless communication system, the method comprising:
    transmitting, to a base station, a radio resource control (RRC) connection setup request message;
    receiving, from the base station, an RRC connection setup message in response to the RRC connection setup request message;

transmitting, to the base station in response to the RRC connection setup message, an RRC connection setup complete message for establishing an RRC connection between the base station and the UE, including first information on a service type;
performing a communication associated with the service type with the base station based on the first information, in case that the service type is included in a plurality of service types supported by the base station; and
performing a handover with a target base station, in case that the target base station to serve the UE is identified during the RRC connection,
wherein a handover request message, transmitted from the base station to the target base station based on the handover, includes second information on at least one service type supported by the UE.

2. The method of claim 1, wherein the target base station is identified by the base station based on third information on at least one service supported by the target base station, and
wherein the third information is transmitted from the target base station to the base station by an X2 setup procedure.

3. A method performed by a base station in a wireless communication system, the method comprising:
receiving, from a user equipment (UE), a radio resource control (RRC) connection setup request message;
transmitting, to the UE, an RRC connection setup message, in response to the RRC connection setup request message;
receiving, from the UE in response to the RRC connection setup message, an RRC connection setup complete message for establishing an RRC connection between the base station and the UE, including first information on a service type;
identifying whether a plurality of service types supported by the base station includes the service type, based on the first information;
performing a communication associated with the service type with the UE, in case that the service type is included in the plurality of service types; and
transmitting, to a target base station, a handover request message for the UE, in case that the target base station is identified during the RRC connection,
wherein the handover request message includes second information on at least one service type supported by the UE.

4. The method of claim 3, further comprising:
receiving, from the target base station, third information on at least one service type supported by the target base station by an X2 setup procedure; and
identifying the target base station based on the third information.

5. A user equipment (UE) in a wireless communication system, the UE comprising:
a transceiver configured to transmit and receive a signal; and
a controller configured to:
control the transceiver to transmit, to a base station, a radio resource control (RRC) connection setup request message,
control the transceiver to receive, from the base station, an RRC connection setup message in response to the RRC connection setup request message,
control the transceiver to transmit, to the base station in response to the RRC connection setup message, an RRC connection setup complete message for establishing an RRC connection between the base station and the UE, including first information on a service type,
perform a communication associated with the service type with the base station, in case that the service type is included in a plurality of service types supported by the base station, and
perform a handover with a target base station, in case that the target base station to serve the UE is identified during the RRC connection,
wherein a handover request message, transmitted from the base station to the target base station based on the handover, includes second information on at least one service type supported by the UE.

6. The UE of claim 5,
wherein the target base station is identified by the base station based on third information on at least one service supported by the target base station, and
wherein the third information is transmitted from the target base station to the base station by an X2 setup procedure.

7. A base station in a wireless communication system, the base station comprising:
a transceiver configured to transmit and receive a signal; and
a controller configured to:
control the transceiver to receive, from a user equipment (UE), a radio resource control (RRC) connection setup request message,
control the transceiver to transmit, to the UE, an RRC connection setup message in response to the RRC connection setup request message,
control the transceiver to receive, from the UE in response to the RRC connection setup message, an RRC connection setup complete message for establishing an RRC connection between the base station and the UE, including first information on a service type,
identify whether a plurality of service types supported by the base station includes the service type, based on the first information,
perform a communication associated with the service type with the UE based on the first information, in case that the service type is included in the plurality of service types, and
control the transceiver to transmit, to a target base station, a handover request message for the UE, in case that the target base station is identified during the RRC connection,
wherein the handover request message includes second information on at least one service type supported by the UE.

8. The base station of claim 7, wherein the controller is further configured to control the transceiver to receive, from the target base station, third information on at least one service type supported by the target base station by an X2 setup procedure, and identify the target base station based on the third information.

9. The method of claim 1, wherein an initial context setup request message after the RRC connection is established, transmitted from an entity managing a mobility of the UE to the base station, includes the second information on the at least one service type supported by the UE.

10. The method of claim 1, wherein the plurality of service types include a first service type associated with transmission delay, and a second service type associated with a massive communication.

11. The method of claim 1, further comprising:
receiving, from the base station, information for accessing to another base station which supports the service type, in case that the service type is not included in the plurality of the service types supported by the base station.

12. The method of claim 3, further comprising:
transmitting, to an entity managing a mobility of the UE, an initial UE message after the RRC connection is established; and
receiving, from the entity managing the mobility of the UE, an initial context setup request message, in response to the initial UE message,
wherein the initial context setup request message includes the second information on the at least one service type supported by the UE.

13. The method of claim 3, wherein the plurality of service types include a first service type associated with transmission delay, and a second service type associated with a massive communication.

14. The method of claim 3, further comprising:
transmitting, to the UE, information for accessing to another base station which supports the service type, in case that the service type is not included in the plurality of the service types supported by the base station.

15. The UE of claim 5, wherein an initial context setup request message after the RRC connection is established, transmitted from an entity managing a mobility of the UE to the base station, includes the second information on the at least one service type supported by the UE.

16. The UE of claim 5, wherein the plurality of service types include a first service type associated with transmission delay, and a second service type associated with a massive communication.

17. The UE of claim 5, wherein the controller is further configured to control the transceiver to receive, from the base station, information for accessing to another base station which supports the service type, in case that the service type is not included in the plurality of the service types supported by the base station.

18. The base station of claim 7,
wherein the controller is further configured to control the transceiver to transmit, to an entity managing a mobility of the UE, an initial UE after the RRC connection is established, and receive, from the entity managing the mobility of the UE, an initial context setup request message, in response to the initial UE message, and
wherein the initial context setup request message includes the second information on the at least one service type supported by the UE.

19. The base station of claim 7, wherein the plurality of service types include a first service type associated with transmission delay, and a second service type associated with a massive communication.

20. The base station of claim 7, wherein the controller is further configured to control the transceiver to transmit, to the UE, information for accessing to another base station which supports the service type, in case that the service type is not included in the plurality of the service types supported by the base station.

\* \* \* \* \*